(12) United States Patent
Nadella et al.

(10) Patent No.: US 11,010,757 B2
(45) Date of Patent: May 18, 2021

(54) INTELLIGENT MOBILE PAYMENT SYSTEM AND METHOD

(71) Applicant: MASTERCARD INTERNATIONAL INCORPORATED, Purchase, NY (US)

(72) Inventors: Sekhar Nadella, Saint Peters, MO (US); Ravi Avula, Lake Saint Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/517,157

(22) Filed: Jul. 19, 2019

(65) Prior Publication Data

US 2019/0340604 A1 Nov. 7, 2019

Related U.S. Application Data

(63) Continuation of application No. 13/758,431, filed on Feb. 4, 2013, now abandoned.

(51) Int. Cl.
*G06Q 20/36* (2012.01)
*G06Q 20/32* (2012.01)
(Continued)

(52) U.S. Cl.
CPC ......... *G06Q 20/367* (2013.01); *G06Q 20/204* (2013.01); *G06Q 20/227* (2013.01); *G06Q 20/327* (2013.01); *G06Q 20/405* (2013.01)

(58) Field of Classification Search
CPC ........ G06Q 30/00; G06Q 20/00; G06Q 20/36; G06Q 20/32; G06Q 20/40; G06Q 40/00; G06K 5/00
(Continued)

(56) References Cited

U.S. PATENT DOCUMENTS

| 7,428,507 B2 | 9/2008 | Villaret et al. |
| 7,587,363 B2 | 9/2009 | Cataline et al. |

(Continued)

FOREIGN PATENT DOCUMENTS

| KR | 1020090063037 A | 6/2009 |
| KR | 1020110128573 A | 11/2011 |
| WO | 2009143084 A1 | 11/2009 |

OTHER PUBLICATIONS

ISR/WO PCT/US2013/069122 dated Feb. 20, 2014, 11 pages.

*Primary Examiner* — Olusegun Goyea
(74) *Attorney, Agent, or Firm* — Armstrong Teasdale LLP

(57) ABSTRACT

An intelligent wallet (IW) computer device is provided for recommending a payment card from a plurality of payment cards to a cardholder for use in a payment transaction with a merchant. The IW computer device includes a memory device for storing data and a processor in communication with the memory device. The processor is programmed to receive event data and transaction data associated with the payment transaction. The transaction data includes product identifier data and purchase amount data. The processor is further programmed to receive payment card rules and cardholder preferences for each of the plurality of payment cards associated with the cardholder and to recommend a candidate payment card from the plurality of payment cards. The candidate payment card is recommended by processing the event data and the transaction data with the payment card rules and the cardholder preferences.

23 Claims, 8 Drawing Sheets

(51) Int. Cl.
  *G06Q 20/22* (2012.01)
  *G06Q 20/20* (2012.01)
  *G06Q 20/40* (2012.01)

(58) Field of Classification Search
  USPC .... 705/14.27, 17, 40, 26.7, 44, 21, 35, 14.3, 705/14.33, 14.51, 14.38; 235/380, 375
  See application file for complete search history.

(56) References Cited

U.S. PATENT DOCUMENTS

| | | | |
|---|---|---|---|
| 8,016,192 B2* | 9/2011 | Messerges | G06Q 20/32 235/380 |
| 8,123,128 B1* | 2/2012 | Zhu | G06Q 20/3572 235/380 |
| 8,285,329 B1 | 10/2012 | Zhu | |
| 2002/0111916 A1 | 8/2002 | Coronna et al. | |
| 2002/0152123 A1* | 10/2002 | Giordano | G06Q 20/322 705/14.33 |
| 2003/0004797 A1 | 1/2003 | Villaret et al. | |
| 2008/0126145 A1* | 5/2008 | Rackley III | G06Q 20/102 455/406 |
| 2008/0228591 A1 | 9/2008 | Watanabe et al. | |
| 2008/0249936 A1 | 10/2008 | Miller et al. | |
| 2009/0018923 A1* | 1/2009 | Chen | G06Q 20/04 705/17 |
| 2009/0192913 A1 | 7/2009 | Saito et al. | |
| 2010/0082445 A1* | 4/2010 | Hodge | G06Q 20/20 705/21 |
| 2010/0257033 A1* | 10/2010 | Roberts | G06Q 20/202 705/14.3 |
| 2011/0153402 A1* | 6/2011 | Craig | G06Q 40/00 705/14.27 |
| 2011/0180598 A1 | 7/2011 | Morgan et al. | |
| 2011/0251892 A1* | 10/2011 | Laracey | G06Q 30/0253 705/14.51 |
| 2012/0166333 A1 | 6/2012 | Von Behren et al. | |
| 2012/0221420 A1 | 8/2012 | Ross | |
| 2012/0265685 A1 | 10/2012 | Brudnicki et al. | |
| 2012/0290449 A1 | 11/2012 | Mullen et al. | |
| 2012/0290472 A1 | 11/2012 | Mullen et al. | |
| 2012/0296726 A1 | 11/2012 | Dessert et al. | |
| 2012/0310760 A1 | 12/2012 | Phillips et al. | |
| 2013/0024371 A1 | 1/2013 | Hariramani et al. | |
| 2013/0054338 A1* | 2/2013 | Merz | G06Q 30/0224 705/14.27 |
| 2013/0080328 A1* | 3/2013 | Royyuru | G06Q 40/02 705/44 |
| 2013/0110709 A1* | 5/2013 | Hodge | G06Q 20/322 705/39 |
| 2013/0173456 A1 | 7/2013 | Grigg et al. | |
| 2013/0238455 A1* | 9/2013 | Laracey | G06Q 20/108 705/21 |
| 2013/0246260 A1* | 9/2013 | Barten | G06Q 20/3674 705/41 |

\* cited by examiner

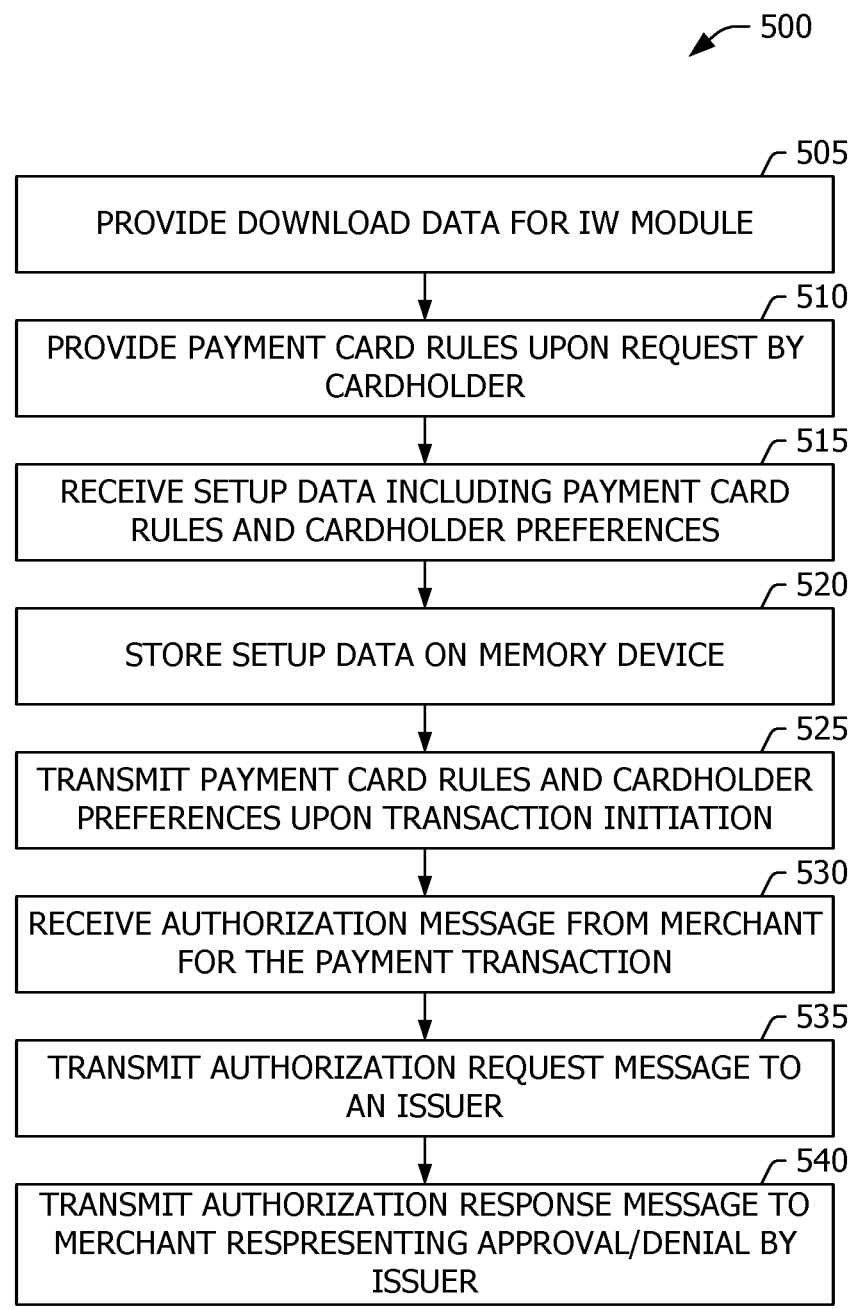

INTELLIGENT MOBILE PAYMENT SYSTEM AND METHOD

CROSS REFERENCE TO RELATED APPLICATIONS

This application is a continuation application of U.S. patent application Ser. No. 13/758,431, filed Feb. 4, 2013, entitled "INTELLIGENT MOBILE PAYMENT SYSTEM AND METHOD", the disclosure of which is hereby incorporated herein by reference in its entirety.

BACKGROUND

The field of the invention relates generally to recommending a payment card for a payment transaction and, more particularly, to a mobile payment device configured to intelligently select a payment card based on collected data, rules, and cardholder preferences for initiating a payment transaction with a merchant using the selected payment card.

Payment cards, such as credit and debit cards, are used for transacting business and making purchases throughout our society. Oftentimes, an issuer of a payment card will provide promotional offers and/or reward programs with the payment cards as an incentive for a cardholder to acquire and use the card. The issuer will establish rules that govern the use of these promotional offers and/or rewards programs. Merchants and/or third party payment processors may also have rules that apply to the use of payment cards. In combination with other standard rules governing payment card usage (e.g., expiration date, available credit line, etc.), these many different rules can present challenges to the cardholder when the cardholder goes to select a payment card from their wallet to make a purchase.

Choosing the right payment card for a payment transaction is further complicated when a cardholder has many payment cards to choose from. In addition, a cardholder may prefer to use a certain payment card for certain purchases. For example, a cardholder may prefer to use Payment Card A when making work-related purchases, or may prefer to use Payment Card B when making purchases relating to travel. No known payment systems allow for cardholders to input custom preferences which are automatically considered by the payment system when recommending a payment card to be used. Rather, traditional systems require the cardholder to manually select the right payment card to use. Lack of automation makes choosing the right payment card difficult when a cardholder has many payment cards to choose from.

Accordingly, an automated system for intelligently recommending a payment card for a payment transaction is needed.

BRIEF DESCRIPTION OF THE DISCLOSURE

In one aspect, an intelligent wallet (IW) computer device is provided for recommending a payment card from a plurality of payment cards to a cardholder for use in a payment transaction with a merchant. The IW computer device includes a memory device for storing data and a processor in communication with the memory device. The processor is programmed to receive event data and transaction data associated with the payment transaction. The transaction data includes product identifier data and purchase amount data. The processor is further programmed to receive payment card rules and cardholder preferences for each of the plurality of payment cards associated with the cardholder and to recommend a candidate payment card from the plurality of payment cards. The candidate payment card is recommended by processing the event data and the transaction data with the payment card rules and the cardholder preferences.

In another aspect, a computer-implemented method is provided of recommending a payment card from a plurality of payment cards to a cardholder using an intelligent wallet (IW) computer device. The payment card is to be used in a payment transaction with a merchant. The IW computer device is in communication with a memory device. The method includes receiving, at the IW computer device, event data and transaction data associated with the payment transaction. The transaction data includes product identifier data and purchase amount data. The method also includes receiving payment card rules and cardholder preferences for each payment card associated with the cardholder and using the IW computer device to recommend a candidate payment card from the plurality of payment cards. The candidate payment card is recommended by processing the event data and the transaction data with the payment card rules and the cardholder preferences.

In yet another aspect, a computer system is provided for recommending a payment card from a plurality of payment cards to a cardholder for use in a payment transaction with a merchant. The computer system includes a memory device for storing data, a processor in communication with the memory device, and an intelligent wallet (IW) module stored on the memory device. The computer system is configured to receive event data and transaction data associated with the payment transaction. The transaction data includes product identifier data and purchase amount data. The computer system is also configured to receive payment card rules and cardholder preferences for each payment card associated with the cardholder and recommend a candidate payment card from the plurality of payment cards. The candidate payment card is recommended by processing the event data and the transaction data with the payment card rules and the cardholder preferences.

In yet another aspect, one or more computer-readable storage media having computer-executable instructions embodied thereon are provided. When executed by at least one processor, the computer-executable instructions cause the processor to receive event data and transaction data associated with a payment transaction, the transaction data including product identifier data and purchase amount data, receive payment card rules and cardholder preferences for each of a plurality of payment cards associated with a cardholder, and recommend a candidate payment card from the plurality of payment cards by processing the event data and the transaction data with the payment card rules and the cardholder preferences.

BRIEF DESCRIPTION OF THE DRAWINGS

FIGS. 1-8 show exemplary embodiments of the system and method described herein.

FIG. 1 is a schematic diagram illustrating an exemplary multi-party payment card industry system for enabling ordinary payment-by-card transactions in which merchants and card issuers do not necessarily have a one-to-one relationship;

FIG. 2 is a simplified block diagram of an exemplary payment processing system including a cardholder computing device having an intelligent wallet module in accordance with one embodiment of the present invention;

FIG. 3 is an expanded block diagram of an exemplary embodiment of a server architecture of the payment processing system shown in FIG. 2;

FIG. 4 illustrates an exemplary configuration of a cardholder computing device operated by a cardholder such as the computer devices shown in FIGS. 2 and 3;

FIG. 5 illustrates an exemplary configuration of a server computer device such as the server system shown in FIGS. 2 and 3;

FIG. 6 is a flowchart of an exemplary method that may be implemented using the system shown in FIGS. 2 and 3 to update an intelligent wallet module of a cardholder computing device in accordance with one embodiment of the present invention; and FIG. 7 is a flowchart of an exemplary method that may be implemented using the system shown in FIGS. 2 and 3 to process a payment transaction.

FIG. 8 is a flowchart of an example method that may be implemented from a perspective of the server system shown in FIGS. 2 and 3 to recommend a candidate payment card to be used by the cardholder in a particular transaction.

DETAILED DESCRIPTION OF THE DISCLOSURE

Figure 1:
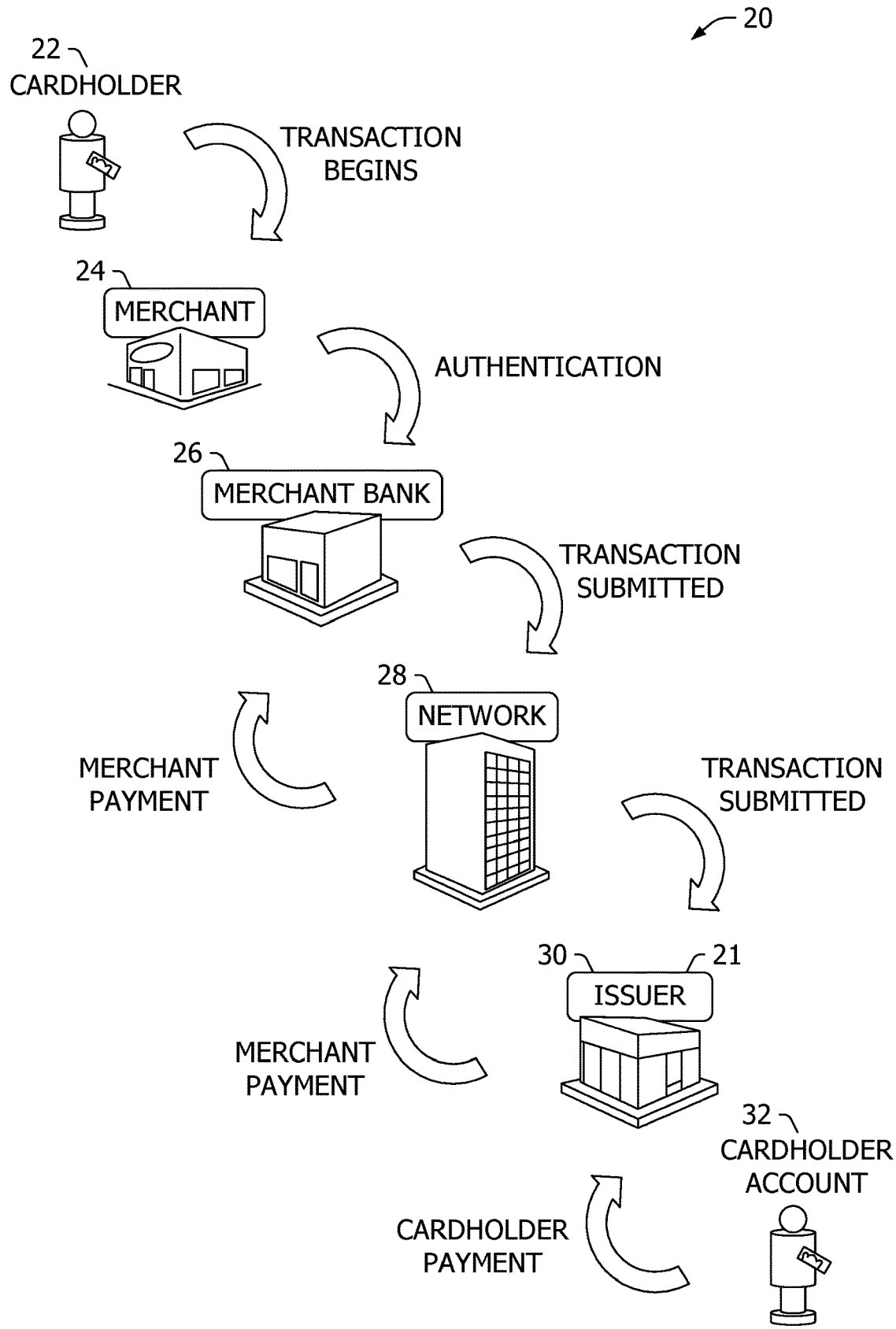

The following detailed description illustrates embodiments of the invention by way of example and not by way of limitation. The description enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, methods and systems for intelligently recommending a payment card to be used by a cardholder in a payment transaction. More specifically, the disclosure describes a cardholder computing device having an intelligent wallet module that is configured to collect payment data, apply payment card rules and cardholder preferences, and recommend a payment card to be used by the cardholder in a particular transaction.

As an example, a cardholder with multiple payment cards that each may have associated promotional offers and/or reward programs is considered. To choose a payment card when making a transaction, the cardholder may need to consider questions such as: may a card with rewards be used for this transaction; has the reward limit for a card been reached; is it beneficial to use one card with rewards over another; may a gift card that is close to expiring be used for this transaction; is this transaction personal or business related; and the like. Accordingly, the systems and methods described herein will intelligently recommend a payment card for use in a particular transaction that takes into account the various rules and preferences.

During operation, a cardholder makes a purchase from a merchant using a cardholder computing device having an intelligent wallet module. The intelligent wallet module automatically recommends a candidate payment card to use for the transaction based on payment card rules, cardholder preferences, and collected data. The recommended candidate payment card is selected such that the payment card rules and cardholder preferences are upheld and the use/accrual of payment card rewards/incentives is enhanced. Payment card rules govern use of the payment card and are defined by at least one of an issuer, a merchant, and a third party. Cardholder preferences are determined by the cardholder and allow the cardholder to influence the payment card recommendation process.

Before the cardholder makes a purchase, the intelligent wallet module is downloaded to the cardholder computing device associated with the cardholder. The cardholder inputs a plurality of payment cards, payment card rules, and cardholder preferences into the intelligent wallet module. In one embodiment, these data are stored in a central memory device on a server-side of the system, and are accessed by the intelligent wallet module to recommend a payment card for a transaction. In another embodiment, these data are stored in a memory device on the cardholder computing device and are accessed by the cardholder computing device when the cardholder computing device cannot communicate with the central memory device or instead of communicating with the central memory device. The central memory device is, for example, a memory component of a third party system.

When the cardholder is ready to make a purchase from the merchant, a transaction is initiated and the cardholder activates the intelligent wallet module and selects a spending category associated with the purchase. The intelligent wallet module processes the payment card rules and cardholder preferences with additional data including event data (e.g., location data, time data, and the like) and transaction data (e.g., purchase amount, merchant category code, and the like) and recommends a candidate payment card to the cardholder for the transaction.

The cardholder confirms or overrides the recommended candidate payment card. When confirmed, payment card data associated with the candidate payment card is transmitted to the merchant to process the transaction. The merchant generates an authorization request message including the payment card data and transaction data. The authorization request message is transmitted to a payment network, further transmitted to an issuer, and the issuer either approves or denies the transaction. An approved authorization response message is received at the payment network and further transmitted to the merchant. In the case where the recommended payment card is overridden by the cardholder, the cardholder may select a different payment card for the transaction or, alternatively, a default payment card may be used.

When the approved authorization response message is received at a merchant having an enhanced POS device, additional data are transmitted from the enhanced POS device to the cardholder computing device. Specifically, a merchant category code (MCC) is transmitted from the enhanced POS device to the cardholder computing device. The intelligent wallet module again processes the event data, transaction data, payment card rules, and cardholder preferences with the MCC to determine if a different payment card should have been recommended for the transaction. When a different payment card is recommended, the cardholder confirms or overrides the different payment card as before. When confirmed, the different recommended payment card is authorized and the transaction continues.

The intelligent wallet module receives confirmation for the payment from the cardholder when the recommended payment card is approved. When the cardholder confirms the payment, the transaction is completed. Spending data, including at least the transaction data, are stored in the central memory device when the transaction is complete. The intelligent wallet module is configured to allow the cardholder to view the spending data by communicating with the central memory device.

A technical effect of the systems and methods described herein is achieved by performing at least one of the following steps: (a) downloading an intelligent wallet module to a cardholder computing device; (b) inputting payment card data for a plurality of payment cards into the downloaded intelligent wallet module, wherein payment card data include at least one of a cardholder account number, an expiration date, and other similar data; (c) storing setup data, including payment card data, payment card rules, and cardholder preferences, at a central memory device associated with a server-side of the payment system, wherein payment card rules are determined by at least one of an issuer, a merchant, and a third party and cardholder preferences are determined by a cardholder; (d) initiating a transaction with a merchant; (e) activating the intelligent wallet module; (f) selecting or inputting a spending category into the intelligent wallet module; (g) inputting event data and transaction data into the intelligent wallet module, wherein event data are gathered from the cardholder computing device and transaction data are communicated to the cardholder computing device from a merchant device; (h) retrieving payment card rules and cardholder preferences from the central memory device; (i) applying payment card rules and cardholder preferences to event data and transaction data using the intelligent wallet module; (j) recommending a candidate payment card to use for the transaction using the intelligent wallet module; (k) approving or overriding the recommended candidate payment card by the cardholder; (l) transmitting payment card data of the approved payment card to the merchant, wherein the payment card data are transmitted by one of swiping the payment card at a merchant POS device and electronically providing the payment card using the intelligent wallet module; (m) authorizing the transaction, wherein the authorization process includes transmitting an authorization request message from the merchant POS device to a payment network, further transmitting the authorization request message to an issuer, receiving at the payment network an authorization response message from the issuer either approving or denying the transaction, and transmitting the authorization response message from the payment network to the merchant POS device; (n) receiving the approved authorization response message at the merchant POS device from the payment network; (o) in the case where the merchant POS device is an enhanced POS device, transmitting a MCC from the enhanced POS device to the intelligent wallet module and determining whether a different payment card should have been recommended for the transaction based on the received MCC using the intelligent wallet module; (p) when a different payment card is recommended for the transaction, recommending the different payment card to the cardholder for the transaction using the intelligent wallet module; (q) when the merchant POS device is not an enhanced POS device, receiving confirmation by the cardholder for the payment and completing the transaction; and (r) tracking and viewing spending data, wherein spending data includes transaction data for completed transactions and spending data are viewed by the cardholder using the intelligent wallet module. Additionally, the intelligent payment system is configured to store setup data in a memory device of the cardholder computing device.

As used herein, the terms "transaction card", "financial transaction card", and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of payment card can be used as a method of payment for performing a transaction. In addition, payment card account behavior can include but is not limited to purchases, management activities (e.g., balance checking), bill payments, achievement of targets (e.g., meeting account balance goals, paying bills on time), and/or product registrations (e.g., mobile application downloads).

As used herein, the term processor refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

FIG. 1 is a schematic diagram illustrating an exemplary multi-party payment card industry system 20 for enabling ordinary payment-by-card transactions in which merchants and card issuers do not necessarily have a one-to-one relationship. The present invention relates to a payment card system, such as a credit card payment system using the MasterCard® payment system. The MasterCard® payment system is a proprietary communications standard promulgated by MasterCard International Incorporated® for the exchange of financial transaction data between financial institutions that are members of MasterCard International Incorporated® (MasterCard is a registered trademark of MasterCard International Incorporated located in Purchase, N.Y.).

In a typical payment card system, a financial institution (i.e., issuer 21) issues a payment card (i.e., a credit card account or a debit card account) to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank". When cardholder 22 tenders payment for a purchase with a payment card, merchant 24 requests authorization from merchant bank 26 for the amount of the purchase. The request may be performed over the telephone, but is usually performed through the use of a point-of-sale (POS) device, which reads the cardholder's account information from the magnetic stripe on the payment card and communicates electronically with the transaction processing computers of merchant bank 26. Alternatively, merchant bank 26 may authorize a third party to perform transaction processing on its behalf. In this case, the POS device will be configured to communicate with the third party. Such a third party is usually called a "merchant processor" or an "acquiring processor".

Using a network interface processor 28, the computers of the merchant bank or the merchant processor will communicate with the computers of issuer 30 to determine whether the cardholder's account is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because payment card associations, such as MasterCard International Incorporated®, have promulgated rules that do not allow a merchant to charge, or "capture", a transaction until goods are shipped or services are delivered. When a merchant ships or delivers the goods or services, merchant 24 captures the transaction by, for example, appropriate data entry procedures on the POS device. If a cardholder cancels a transaction before it is captured, a "void" is generated. If a cardholder returns goods after the transaction has been captured, a "credit" is generated.

For debit card transactions, when a request for a personal identification number (PIN) authorization is approved by the issuer, cardholder's account 32 is decreased. Normally, a charge is posted immediately to cardholder's account 32. The payment card association then transmits the approval to the acquiring processor for distribution of goods/services or information, or cash in the case of an automated teller machine (ATM).

After a transaction is captured, the transaction is settled between merchant 24, merchant bank 26, and issuer 30. Settlement refers to the transfer of financial data or funds between the merchant's account, merchant bank 26, and issuer 30 related to the transaction. Usually, transactions are captured and accumulated into a "batch", which is settled as a group.

Figure 2:
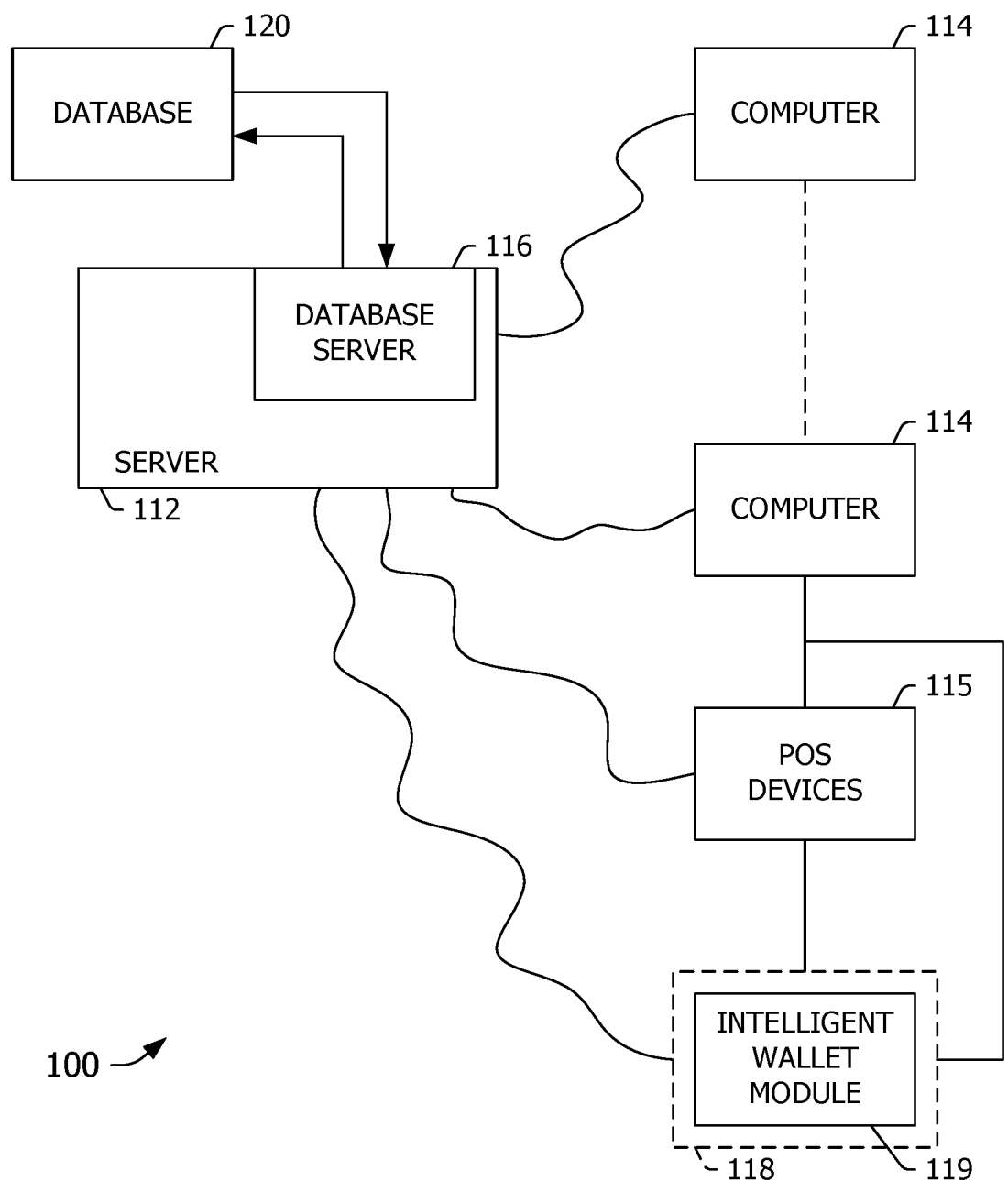

FIG. 2 is a simplified block diagram of an exemplary payment processing system 100 including a plurality of computer devices in accordance with one embodiment of the present invention. In the exemplary embodiment, system 100 can be utilized by cardholders as part of a process of initiating an authorization request and performing a transaction as described below. In addition, system 100 is a payment processing system that includes a cardholder computing device 118 having an intelligent wallet module 119. As described below in more detail, intelligent wallet module 119 is configured to automatically recommend a payment card to a cardholder for performing a payment transaction based at least in part on payment card rules, cardholder preferences, and the type of transaction. Therefore, payment processing system 100 can also be referred to as an intelligent payment system.

More specifically, in the exemplary embodiment, system 100 includes a server system 112, which is a type of computer system, and a plurality of client sub-systems (also referred to as client systems 114) connected to server system 112. In one embodiment, client systems 114 are computers including a web browser and a memory device, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, PDA, or other web-based connectable equipment.

System 100 also includes POS devices 115, which are connected to client systems 114 and may be connected to server system 112. POS devices 115 are interconnected to the Internet through many interfaces including a network, such as a LAN or WAN, dial-in-connections, cable modems, wireless modems, and special high-speed ISDN lines. POS devices 115 could be any device capable of interconnecting to the Internet and may include an input device capable of reading information from a cardholder's payment card.

A database server 116 is connected to database 120, which contains information on a variety of matters, as described below in greater detail. In one embodiment, centralized database 120 is stored on server system 112 and can be accessed by cardholders at one of client systems 114 by logging onto server system 112 through one of client systems 114. In an alternative embodiment, database 120 is stored remotely from server system 112 and may be non-centralized. Database 120 may store transaction data generated as part of sales activities conducted over the payment card network including data relating to merchants, account holders or cardholders, and purchases. Database 120 may also store account data including at least one of a cardholder name, a cardholder address, an account number, and other account identifiers. Database 120 may also store merchant data including a merchant identifier that identifies each merchant registered to use the payment card network, and instructions for settling transactions including merchant bank account information. Database 120 may also store primary account numbers (PANs) or bank account numbers for various parties including merchants and cardholders, along with payment verification identifiers and other data necessary to implement the system and processes described herein.

System 100 also includes at least one cardholder computing device 118, which is configured to communicate with at least one of POS devices 115, client systems 114 and server system 112. In the exemplary embodiment, cardholder computing device 118 is associated with or controlled by a cardholder making a purchase using system 100. Cardholder computing device 118 is interconnected to the Internet through many interfaces including a network, such as a LAN or WAN, dial-in-connections, cable modems, wireless modems, and special high-speed ISDN lines. Cardholder computing device 118 may be any device capable of interconnecting to the Internet including a web-based phone, smartphone, PDA, iPhone® (iPhone is a registered trademark of Apple, Incorporated located in Cupertino, Calif.), Android® device (Android is a registered trademark of Google Incorporated located in Mountain View, Calif.), and/or any device capable of executing stored computer-readable instructions. Cardholder computing device 118 is configured to communicate with POS devices 115 using various outputs including, for example, Bluetooth communication, radio frequency communication, near field communication, network-based communication, and the like.

In the exemplary embodiment, cardholder computing device 118 includes an intelligent wallet module 119. Intelligent wallet module 119 is configured to receive and store data associated with a plurality of payment cards. In other words, payment card data associated with a payment card issued by an issuing bank to a cardholder are stored within module 119 or within the central memory device which is accessible by device 118. Payment card data may include an account number and payment card number. Intelligent wallet module 119 allows cardholder computing device 118 to automatically recommend a payment card to a cardholder based on collected data, payment card rules, and cardholder preferences, process a transaction using a selected payment card, and track spending data for processed transactions. Collected data may include geo-location data, transaction data, and time data. Geo-location data refers to the physical location of the cardholder computing device obtained, for example, using a global positioning satellite (GPS) system or other functionality provided by the device. Time data refers to information such as, but not limited to, a calendar date and/or time of day at which a transaction is processed. Rules are defined by the payment card issuer and may include a payment card expiration date, transaction limit, and available credit line. Preferences are determined by the cardholder and may include date, amount, location, or transaction category preferences that facilitate control of the card recommendation and selection process. For example, a cardholder may decide that during specified months, or for transactions of a minimum amount, a certain payment card is preferred.

In the exemplary embodiment, cardholder computing device 118 processes a transaction by first transmitting payment card data to a merchant POS device, such as POS devices 115. The transaction is further processed, and settled, in a typical multi-party payment card industry system, e.g., system 20 (shown in FIG. 1).

In the exemplary embodiment, intelligent wallet module 119 includes a spending tracker which processes spending tracker data to allow the cardholder to view expense tracking details, estimate payment card rewards, and the like. Cardholder computing device 118 may also process spending tracker data when automatically recommending a payment card.

In the exemplary embodiment, one of client systems 114 may be associated with an acquirer, a cardholder, or a customer; while another one of client systems 114 may be associated with an issuer; POS devices 115 may be associated with a merchant; cardholder computing device 118 may be associated with a cardholder or a customer; and server system 112 may be associated with the payment card network or the interchange network.

Figure 3:
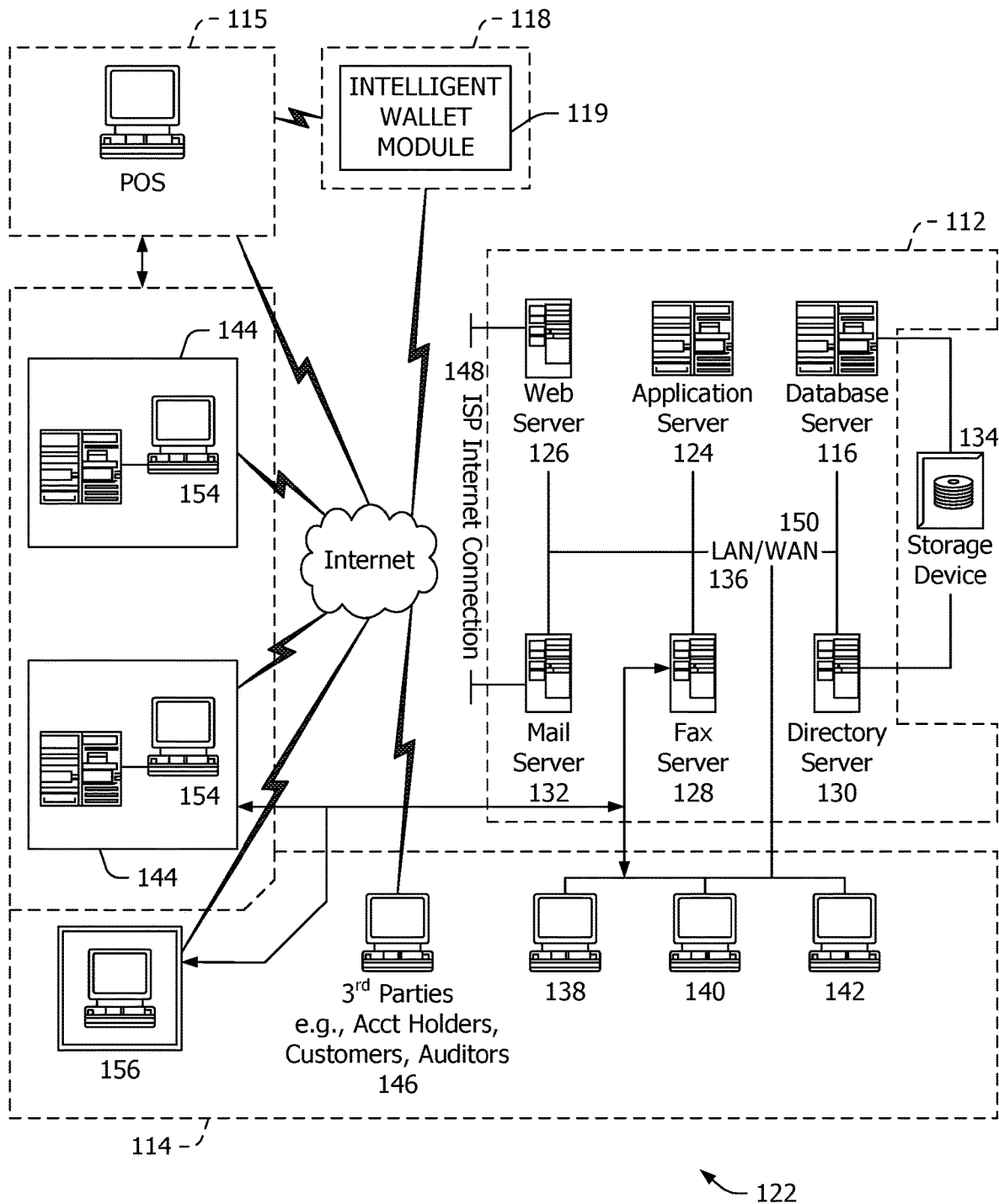

FIG. 3 is an expanded block diagram of an exemplary embodiment of a server architecture of a payment processing system 122 including a cardholder computing device 118 having an intelligent wallet module 119 in accordance with one embodiment of the present invention. Components in system 122, identical to components of system 100 (shown in FIG. 2), are identified in FIG. 3 using the same reference numerals as used in FIG. 2. System 122 includes server system 112, client systems 114, POS devices 115, and cardholder computing device 118. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a network, such as LAN 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation 138, 140, and 142 is a personal computer having a web browser. Although the functions performed at the workstations are typically illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties 146, e.g., account holders, customers, auditors, developers, consumers, merchants, acquirers, issuers, etc., using an ISP Internet connection 148. The communication in the exemplary embodiment is illustrated as being performed using the Internet, however, any other wide area network type communication can be utilized in other embodiments, i.e., the systems and processes are not limited to being practiced using the Internet. In addition, and rather than LAN 136, WAN 150 could be used in place of LAN 136.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112.

In the exemplary embodiment, cardholder computing device 118 is in wireless communication with POS devices 115 or, alternatively, may be in wireless communication with server system 112 or client systems 114 and other workstations through a network connection.

Figure 4:
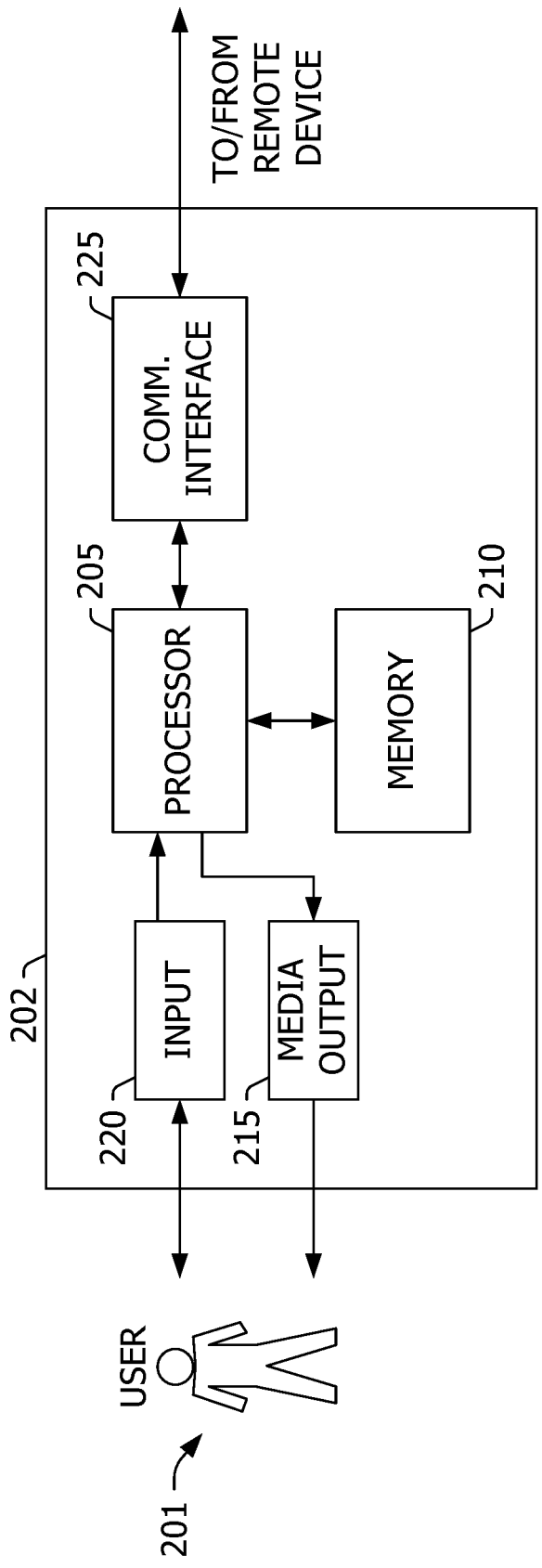

FIG. 4 illustrates an exemplary configuration of a user system 202 operated by a user 201, such as cardholder 22 (shown in FIG. 1). User system 202 may include, but is not limited to, cardholder computing device 118, client systems 114, 138, 140, and 142, POS devices 115, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, 4G, Long Term Evolution (LTE), or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
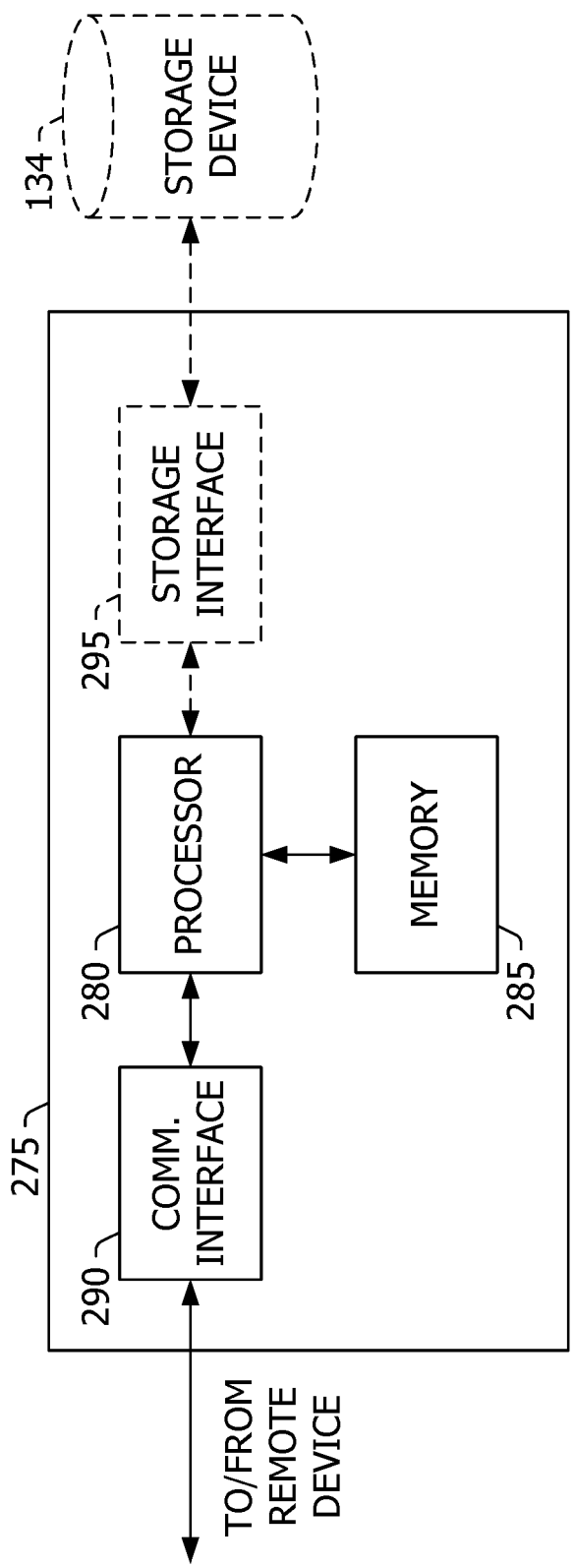

FIG. 5 illustrates an exemplary configuration of a server system 275 such as server system 112 (shown in FIGS. 2 and 3). Server system 275 may include, but is not limited to, database server 116, application server 124, web server 126, fax server 128, directory server 130, and mail server 132.

Server system 275 includes a processor 280 for executing instructions. Instructions may be stored in a memory area 285, for example. Processor 280 may include one or more processing units (e.g., in a multi-core configuration) for executing instructions. The instructions may be executed within a variety of different operating systems on the server system 275, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 280 is operatively coupled to a communication interface 290 such that server system 275 is capable of communicating with a remote device such as a user system or another server system 275. For example, communication interface 290 may receive requests from client system 114 via the Internet, as illustrated in FIGS. 2 and 3.

Processor 280 may also be operatively coupled to a storage device 134. Storage device 134 is any computer-operated hardware suitable for storing and/or retrieving data. In some embodiments, storage device 134 is integrated in server system 275. For example, server system 275 may include one or more hard disk drives as storage device 134. In other embodiments, storage device 134 is external to system 275 and may be accessed by a plurality of server systems 275. For example, storage device 134 may include multiple storage units such as hard disk drives or solid state drives in a redundant array of inexpensive disks (RAID) configuration. Storage device 134 may include a storage area network (SAN) and/or a network attached storage (NAS) system.

In some embodiments, processor 280 is operatively coupled to storage device 134 via a storage interface 295. Storage interface 295 is any component capable of providing processor 280 with access to storage device 134. Storage interface 295 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 280 with access to storage device 134.

Memory area 285 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
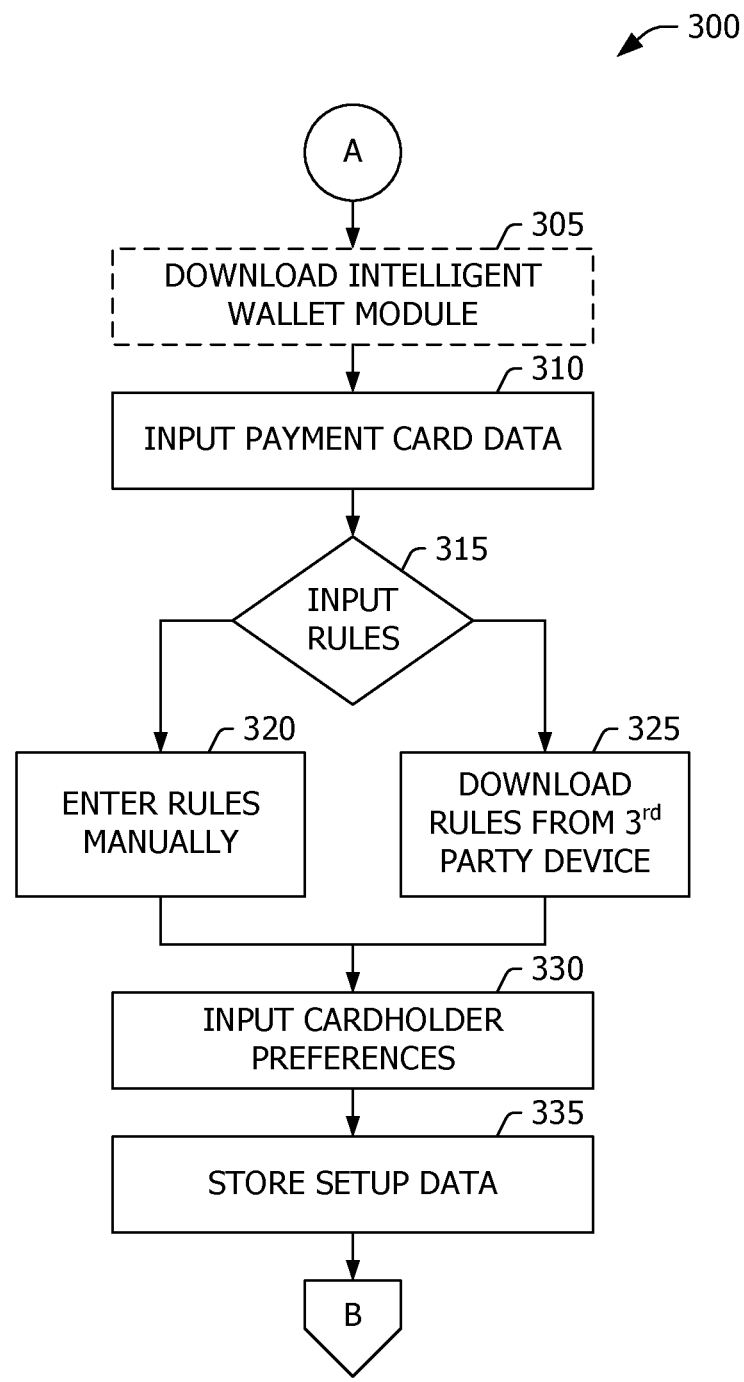

FIG. 6 is a flowchart of an example method 300 that is implemented by the systems shown in FIGS. 2 and 3 for updating an intelligent wallet module of a cardholder computing device. During operation, a cardholder downloads 305 an intelligent wallet module to a cardholder computing device. During subsequent operations, the intelligent wallet module is not re-downloaded to the cardholder computing device unless the intelligent wallet module has been previously removed from the cardholder computing device.

Payment card data for a plurality of payment cards are then input 310 into the intelligent wallet module. Payment card data may include an account number and an expiration date. Payment card rules for the plurality of payment cards are input 315 by entering 320 manually (e.g., by using an input device of the cardholder computing device) or downloading 325 from a third party device (not shown). In the exemplary embodiment, a third party device is a server system, e.g., server system 275 (shown in FIG. 5). The payment card rules can be stored on memory at the cardholder computing device or at the central memory device on the server-side of the system.

Cardholder preferences are then input 330 into the intelligent wallet module by the cardholder using functionality of the cardholder computing device. For example, an output device of the cardholder computing device may present the cardholder with one or more preference choices. The cardholder computing device then receives, e.g., from an input device, a response from the cardholder indicating their preference choice or choices. Alternatively, or in combination, the cardholder computing device may present a blank dialog that allows the cardholder to enter a preference of their choosing.

The cardholder computer device then stores 335 the payment card data for each of the plurality of payment cards, the payment card rules for each of the plurality of payment cards, and the cardholder preferences for each of the plurality of payment cards as setup data in a central memory device. The setup data include payment card data, payment card rules, and cardholder preferences. Alternatively, or in combination, setup data may be stored in a memory device of the cardholder computing device. In the exemplary embodiment, the central memory device is a component of the third party device.

The method 300 of updating an intelligent wallet module may be implemented when the intelligent wallet module is first executed, or in subsequent executions, when initiated by the cardholder.

Figure 7:
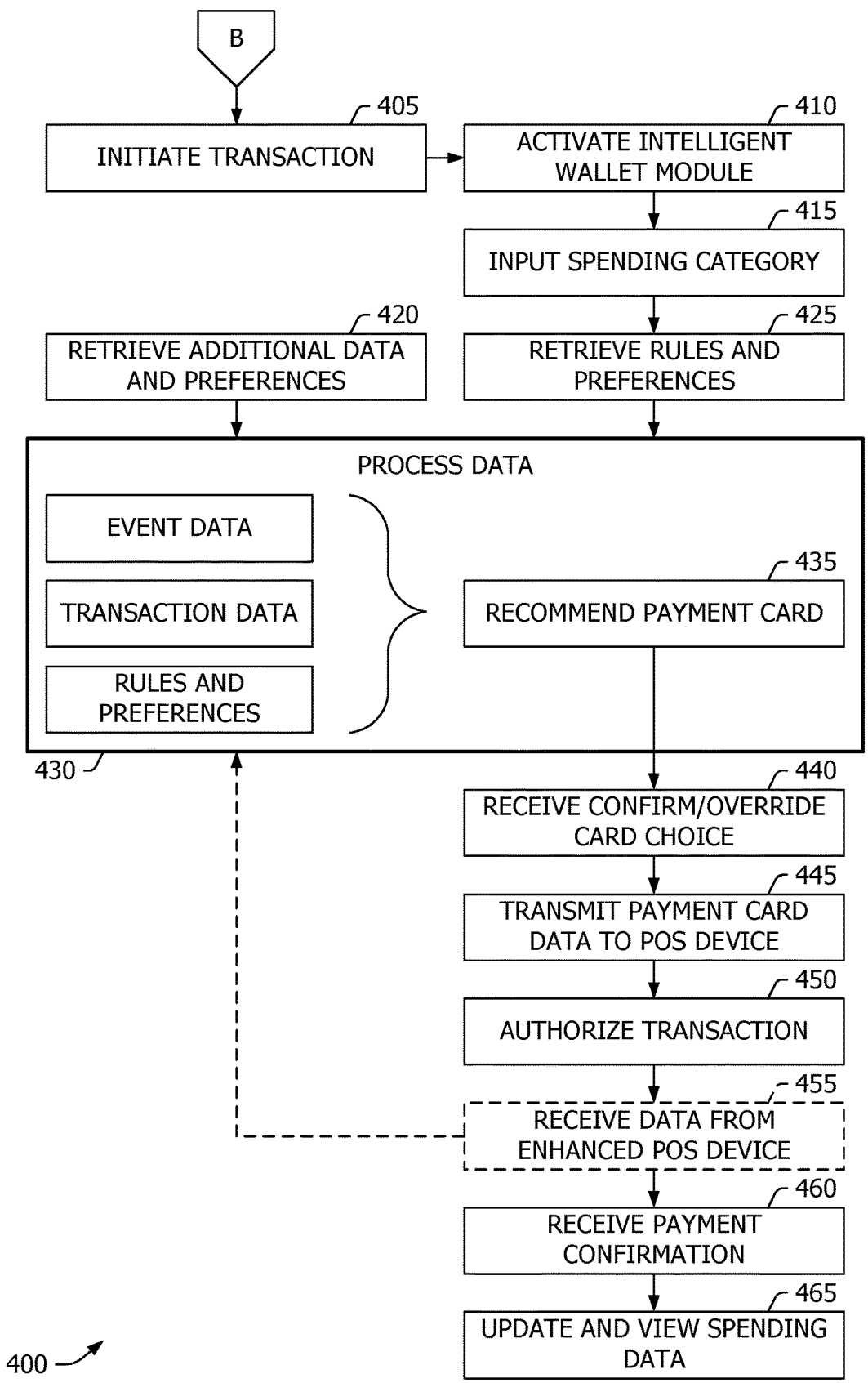

FIG. 7 is a flowchart of an example method 400 that may be implemented in the server system shown in FIGS. 2 and 3 to collect payment data, apply payment card rules and cardholder preferences, and recommend a candidate payment card to be used by the cardholder in a particular transaction. Specifically, during implementation, payment card data are transmitted from a cardholder computing device having an intelligent wallet module, e.g., cardholder computing device 118 and intelligent wallet module 119, to a POS device, e.g., POS devices 115, to process a payment transaction between a cardholder and a merchant.

During operation, a cardholder initiates 405 a transaction with a merchant. The cardholder activates 410 the intelligent wallet module when the cardholder is ready to make a purchase from the merchant. When activated, the cardholder inputs 415 a spending category to the intelligent wallet module. The spending category is used at least in part to categorize transactions such that they may be easily referenced, e.g., by the cardholder. In some embodiments, the intelligent wallet module may include a default spending category that is pre-defined by the cardholder, e.g., during implementation of method 300 (shown in FIG. 6). Once the spending category is input, the intelligent wallet module collects data and recommends a candidate payment card to be used by the cardholder for the transaction.

The intelligent wallet module retrieves 420 event data and transaction data to be used when recommending a payment card. Event data are captured by the cardholder computing device and include a geographic location of the cardholder computing device, the current date/time, and the like. Transaction data are communicated to the cardholder computing device from a merchant device, e.g., the POS device associated with the merchant. Transaction data may also be input by the cardholder when the cardholder computing device is unable to communicate with the merchant device. Transaction data includes product identifier data and purchase amount data.

Additionally, the intelligent wallet module retrieves 425 payment card rules and cardholder preferences to be used when recommending a payment card. In the exemplary embodiment, payment card rules and cardholder preferences are retrieved from a central memory device. The central memory device is associated with a third party and is configured to communicate wirelessly with the cardholder computing device, e.g., over the Internet. Alternatively, payment card rules and cardholder preferences may be retrieved from a memory device of the cardholder computing device when, for example, the cardholder computing device is unable to communicate with the central memory device. In some embodiments, retrieving 425 payment card rules and cardholder preferences may include implementation of method 300.

Payment card rules and cardholder preferences are then processed 430 with event data and transaction data using the intelligent wallet module to determine a recommended candidate payment card for the transaction. In the exemplary embodiment, the recommended candidate payment card is selected from the plurality of payment cards loaded in the intelligent wallet module in method 300. Further, the recommended candidate payment card is selected such that the recommended candidate payment card adheres to the payment card rules and cardholder preferences while also enhancing cardholder rewards and incentives. When a recommended candidate payment card cannot be determined by the intelligent wallet module, the intelligent wallet module recommends a default payment card, previously determined by the cardholder. The intelligent wallet module then recommends 435 a candidate payment card to the cardholder based at least in part on the outcome of the previous process.

Once the cardholder is presented with a recommended candidate payment card for the transaction, the intelligent wallet module prompts the cardholder to at least one confirm and override the recommended candidate payment card. The IW computer device then receives 440 a confirm/override message from the cardholder. A confirmation message indicates that the cardholder approves the recommended payment card and an override message indicates that the cardholder disapproves the recommended payment card. When the intelligent wallet module receives 440 an override message, a default or alternative card choice, selected by the cardholder, is used to process the transaction.

The intelligent wallet module then transmits 445 payment card data for the candidate recommended payment card to the merchant. In the exemplary embodiment, payment card data are transmitted from the intelligent wallet module to the merchant by one of swiping the payment card at a merchant POS device and electronically providing the payment card using the intelligent wallet module.

The merchant authorizes 450 the transaction once payment card data are received from the intelligent wallet module. In the exemplary embodiment, the authorization process includes first generating and transmitting an authorization request message from a merchant POS device to a payment network. The payment network transmits the authorization request message to an issuer and receives an authorization response message from the issuer indicating whether the transaction is approved or denied. When the transaction is approved, the authorization response message is transmitted from the payment network to the merchant POS device.

In some embodiments, the merchant POS device is an enhanced POS device. An enhanced POS device is a POS device configured to wirelessly communicate data among the enhanced POS device and the cardholder computing device. When the merchant POS device is an enhanced POS device, the intelligent wallet module receives 455 additional data including a merchant category code (MCC) from the merchant POS device. The intelligent wallet module determines whether a different payment card is recommended for the transaction based on the received MCC by processing 430 the event data, transaction data, payment card rules, and cardholder preferences with the received MCC. When a different payment card is recommended for the transaction, the different payment card is recommended 435 to the cardholder for the transaction. The intelligent wallet module then receives 440 a confirmation/override choice from the cardholder for the recommended payment card. When the recommended payment card is confirmed, the intelligent wallet module transmits 445 payment card data associated with the recommended payment card to the merchant POS device and the transaction is authorized 450.

Whether the merchant POS device is, or is not, an enhanced POS device, once the transaction is authorized the intelligent wallet module receives 460 confirmation for the payment from the cardholder. When the cardholder does not confirm payment, the transaction is canceled and the transaction is not processed. When payment confirmation is received 460, the intelligent wallet module updates 465 spending data which may then be tracked and/or viewed by the cardholder. In the exemplary embodiment, spending data include transaction data for completed transactions and are stored at the central memory device.

FIG. 8 is a flowchart of an example method 500 that may be implemented from a perspective of the server system shown in FIGS. 2 and 3 to recommend a candidate payment card to be used by the cardholder in a particular transaction. In the example embodiment, the server system is associated with a payment card network. However, the server system may be associated with any third party to the payment transaction that enables the intelligent wallet module to function as described herein. From a perspective of the third-party server, the intelligent wallet module operates as follows. In the example embodiment, upon request by the cardholder computing device to download the intelligent wallet module, the third party server provides 505 download data for the intelligent wallet module. The download data is stored on a memory device associated with the third-party server. The third-party server provides the download data to the cardholder computing device via the Internet.

When the IW module prompts the cardholder to input payment card rules for a payment card, they may either me entered manually or downloaded from the third-party server. In the example embodiment, payment card rules are stored on the third-party memory device. During setup by the cardholder, the third-party server provides 510 payment card rules stored on the third party memory device to the cardholder computing device for cards specified by the cardholder. Upon input of all setup data by the cardholder, the third-party server receives 515 the setup data, including payment card data, payment card rules, and cardholder preferences input by the cardholder, and stores 520 the setup data on the memory device.

After the cardholder initiates a transaction with a merchant, the cardholder computing device requests the payment card rules and cardholder preferences from the third-party memory device. The third-party server communicates with the cardholder computing device, and retrieves the payment card rules and cardholder preferences from the memory device and transmits 525 them to the cardholder computing device. The IW module then uses the data to recommend a candidate payment card, as described above.

In the example embodiment, the third-party server also receives 530 an authorization message from the merchant for the payment transaction. The third-party server then transmits 535 the authorization request message to an issuer and receives an authorization response message from the issuer indicating whether the transaction is approved or denied. When the transaction is approved, the third-party server transmits 540 the authorization response message back to the merchant POS device.

In an alternate embodiment, the intelligent wallet module is associated with and stored on the third-party server. The cardholder accesses the IW module on the third-party server via a web browser or the Internet. Upon setup, the IW module prompts the cardholder to input payment card data, payment card rules, and/or cardholder preferences for a plurality of payment cards. The payment card rules may be manually input by the cardholder or may be provided by the third-party server. The IW module stores the payment card data, payment card rules, and/or cardholder preferences as setup data on a memory device associated with the third-party server.

Upon initiation of a transaction by the cardholder with a merchant, the third-party server receives event data and transaction data associated with the payment transaction from the cardholder computing device and/or a merchant POS device. The third-party server retrieves the payment card rules and the cardholder preferences stored in the third-party memory device. The third-party server processes the event data and transaction data with the payment card rules and cardholder preferences to generate a recommended candidate payment card. The third-party server then transmits the candidate payment card to the cardholder computing device via the Internet to be displayed on the cardholder computing device for cardholder approval.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications or code) include machine instructions for a programmable processor, and can be implemented in a high-level procedural and/or object-oriented programming language, and/or in assembly/machine language. As used herein, the terms "machine-readable storage medium" and "computer-readable storage medium" refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term "machine-readable signal" refers to any signal used to provide machine instructions and/or data to a programmable processor. The machine-readable storage medium and computer-readable medium do not include transitory signals.

The above-described embodiments of an intelligent mobile payment system and method provide a means for intelligently selecting a payment card for performing a payment transaction. Specifically, the above-described embodiments enable a cardholder to automatically and intelligently select a payment card for a transaction, process the transaction using the selected payment card, and track spending data for processed transactions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An intelligent wallet (IW) computer device for recommending a payment card from a plurality of payment cards to a cardholder for use in a payment transaction with a merchant, wherein said IW computer device is a mobile computing device associated with the cardholder, said IW computer device comprising:
   a memory device for storing data; and
   a processor in communication with said memory device and in communication with an enhanced point-of-sale (POS) computer device configured to communicate with said IW computer device wirelessly, wherein the enhanced POS computer device is further configured to provide a merchant category code (MCC) selected from a group of merchant category codes and identifying a business category associated with the merchant, said processor programmed to:

download payment card rules for each of the plurality of payment cards from a third party computing device and store the downloaded payment card rules in said memory device;

wirelessly receive, from the enhanced POS computer device, event data including at least a time and a location associated with the payment transaction;

wirelessly receive, from the enhanced POS computer device, transaction data associated with the payment transaction, the transaction data including product identifier data, the MCC, and purchase amount data;

receive the payment card rules and cardholder preferences for each of the plurality of payment cards associated with the cardholder from said memory device;

retrieve a current rewards program status associated with each of the plurality of payment cards;

apply the payment card rules and the cardholder preferences to the transaction data including the MCC received from the enhanced POS device to determine a potential rewards program impact on each current rewards program status when each payment card is used to perform the payment transaction;

recommend, based on the determined potential rewards program impact associated with each payment card, a single candidate payment card from the plurality of payment cards by processing the event data and the transaction data with the payment card rules and the cardholder preferences such that the single recommended candidate payment card has the highest potential rewards program impact of the plurality of payment cards;

display the single recommended candidate payment card on said IW computer device without displaying any of the other payment cards of the plurality of payment cards, wherein the single recommended candidate payment card is displayed with a prompt allowing the cardholder to approve the use of the single recommended candidate payment card in the payment transaction;

receive a confirmation message from the cardholder in response to the single recommended candidate payment card; and in response to receipt of the confirmation message, automatically wirelessly transmit payment card data for the single recommended candidate payment card from the IW computer device to the enhanced POS computer device, causing the enhanced POS computer device to transmit the payment card data over a payment network to process the payment transaction.

2. An IW computer device in accordance with claim 1, wherein said processor is further programmed to:

receive setup data including payment card data for each of the plurality of payment cards and the cardholder preferences for each of the plurality of payment cards; and store the setup data within said memory device.

3. An IW computer device in accordance with claim 1, wherein said processor is further programmed to:

receive an override message from the cardholder in response to the single recommended candidate payment card; and in response to receipt of the override message, automatically wirelessly transmit default payment card data for a default payment card from the IW computer device to the enhanced POS computer device, causing the enhanced POS computer device to transmit the default payment card data over the payment network to process the payment transaction.

4. An IW computer device in accordance with claim 1, wherein said processor is programmed to receive the MCC transmitted by the enhanced POS computer device after the enhanced POS computer device transmits an authorization request message over the payment network.

5. An IW computer device in accordance with claim 1, wherein said processor is further programmed to:

receive payment card data for each of the plurality of payment cards associated with the cardholder, the payment card data including at least one of an account number and an expiration date; and store the payment card data on a central data repository.

6. An IW computer device in accordance with claim 1, wherein said processor is further programmed to:

retrieve a plurality of spend data and an estimated payment card reward level from a spending tracker stored at the IW computer device;

receive confirmation of payment for the payment transaction;

calculate a reward impact associated with the confirmation of payment; and update the plurality of spend data and the estimated payment card reward level using the transaction data and the reward impact.

7. An IW computer device in accordance with claim 1, wherein said processor is further programmed to:

determine whether applying the potential rewards program impact to each of the plurality of payment cards will cause a rewards program limit associated with each of the plurality of payment cards to be exceeded; and recommend a candidate payment card from the plurality of payment cards that does not cause the associated rewards program limit to be exceeded.

8. A computer-implemented method of recommending a payment card from a plurality of payment cards to a cardholder using an intelligent wallet (IW) computer device, the IW computer device in communication with an enhanced point-of-sale (POS) computer device configured to communicate with the IW computer device wirelessly, wherein the enhanced POS computer device is further configured to provide a merchant category code (MCC) selected from a group of merchant category codes and identifying a business category associated with the merchant, the payment card to be used in a payment transaction with a merchant, wherein the IW computer device is in communication with a memory device, and wherein the IW computer device is a mobile computing device associated with the cardholder, said method comprising:

downloading, by the IW computing device, payment card rules from a third party computing device and storing the downloaded payment card rules in a memory device;

wirelessly receiving, by the IW computer device, event data including at least a time and a location associated with the payment transaction from the POS computer device;

wirelessly receiving, from the enhanced POS computer device, transaction data associated with the payment transaction, the transaction data including product identifier data, the MCC, and purchase amount data from the enhanced POS computer device;

receiving, by the IW computer device, the payment card rules and cardholder preferences for each of the plurality of payment cards associated with the cardholder;

retrieving a current rewards program status associated with each of the plurality of payment cards;

applying the payment card rules and the cardholder preferences to the transaction data including the MCC received from the enhanced POS device to determine a potential rewards program impact on each current rewards program status when each payment card is used to perform the payment transaction;

using the IW computer device to recommend, based on the determined potential rewards program impact associated with each payment card, a single candidate payment card from the plurality of payment cards by processing the event data and the transaction data with the payment card rules and the cardholder preferences such that the single recommended candidate payment card has the highest potential rewards program impact of the plurality of payment cards;

displaying the single recommended candidate payment card on the IW computer device without displaying any of the other payment cards of the plurality of payment cards, wherein the single recommended candidate payment card is displayed with a prompt allowing the cardholder to approve the use of the single recommended candidate payment card in the payment transaction;

receiving a confirmation message from the cardholder in response to the single recommended candidate payment card; and in response to receipt of the confirmation message, automatically wirelessly transmitting payment card data for the single recommended candidate payment card from the IW computer device to the enhanced POS computer device, causing the enhanced POS computer device to transmit the payment card data over a payment network to process the payment transaction.

9. A computer-implemented method in accordance with claim 8, further comprising:

receiving setup data including payment card data for each of the plurality of payment cards and the cardholder preferences for each of the plurality of payment cards; and storing the setup data within the memory device.

10. A computer-implemented method in accordance with claim 8, further comprising:

receiving payment card data for each of the plurality of payment cards associated with the cardholder, the payment card data including at least one of an account number and an expiration date; and storing the payment card data on a central data repository.

11. A computer-implemented method in accordance with claim 8, further comprising:

retrieving a plurality of spend data and an estimated payment card reward level from a spending tracker stored at the IW computer device;

receiving confirmation of payment for the payment transaction;

calculating a reward impact associated with the confirmation of payment; and updating the plurality of spend data and the estimated payment card reward level using the transaction data and the reward impact.

12. A computer-implemented method in accordance with claim 8, further comprising:

determining whether applying the potential rewards program impact to each of the plurality of payment cards will cause a rewards program limit associated with each of the plurality of payment cards to be exceeded; and recommending a candidate payment card from the plurality of payment cards that does not cause the associated rewards program limit to be exceeded.

13. A computer system for recommending a payment card from a plurality of payment cards to a cardholder for use in a payment transaction with a merchant, said computer system comprising:

a memory device for storing data;

a processor in communication with said memory device;

an intelligent wallet (IW) module stored on said memory device, wherein said memory device is a memory device of a mobile computing device associated with the cardholder; and an enhanced point-of-sale (POS) computer device configured for wireless communication with said IW module, wherein the enhanced POS computer device is further configured to provide a merchant category code (MCC) selected from a group of merchant category codes and identifying a business category associated with the merchant, said IW module configured to:

download payment card rules for each of the plurality of payment cards from a third party computing device and store the downloaded payment card rules in said memory device;

wirelessly receive event data associated with the payment transaction from the enhanced POS computing device;

wirelessly receive transaction data associated with the payment transaction, the transaction data including product identifier data, the MCC, and purchase amount data from the enhanced POS computer device;

receive the payment card rules and cardholder preferences for each of the plurality of payment cards associated with the cardholder;

retrieve a current rewards program status associated with each of the plurality of payment cards;

apply the payment card rules and the cardholder preferences to the transaction data including the MCC received from the enhanced POS device to determine a potential rewards program impact on each current rewards program status when each payment card is used to perform the payment transaction;

recommend, based on the determined potential rewards program impact associated with each payment card, a single candidate payment card from the plurality of payment cards by processing the event data and the transaction data with the payment card rules and the cardholder preferences such that the single recommended candidate payment card has the highest potential rewards program impact of the plurality of payment cards;

display the single recommended candidate payment card to on the mobile computing device without displaying any of the other payment cards of the plurality of payment cards, wherein the single recommended candidate payment card is displayed with a prompt allowing the cardholder to approve the use of the single recommended candidate payment card in the payment transaction;

receive a confirmation message from the cardholder in response to the single recommended candidate payment card; and in response to receipt of the confirmation message, automatically wirelessly transmit payment card data for the single recommended candidate payment card to the enhanced POS computer device, causing the enhanced POS computer device to transmit the payment card data over a payment network to process the payment transaction.

14. A computer system in accordance with claim 13, wherein the event data is captured by said computer system and includes at least one of a geographic location of said computer system, a current date of the transaction, and a current time of the transaction.

15. A computer system in accordance with claim 13, wherein said IW module is further configured to:
receive setup data including payment card data for each of the plurality of payment cards and the cardholder preferences for each of the plurality of payment cards; and
store the setup data within said memory device.

16. A computer system in accordance with claim 13, wherein said IW module is further configured to:
retrieve a plurality of spend data and an estimated payment card reward level from a spending tracker stored at the IW module;
receive confirmation of payment for the payment transaction;
calculate a reward impact associated with the confirmation of payment; and
update the plurality of spend data and the estimated payment card reward level using the transaction data and the reward impact.

17. A computer system in accordance with claim 13, wherein said IW module is further configured to:
determine whether applying the potential rewards program impact to each of the plurality of payment cards will cause a rewards program limit associated with each of the plurality of payment cards to be exceeded; and
recommend a candidate payment card from the plurality of payment cards that does not cause the associated rewards program limit to be exceeded.

18. An IW computer device in accordance with claim 13, wherein said IW module is programmed to receive the MCC transmitted by the enhanced POS computer device after the enhanced POS computer device transmits an authorization request message over the payment network.

19. An IW computer device in accordance with claim 13, wherein said processor is further programmed to:
receive an override message from the cardholder in response to the single recommended candidate payment card; and
in response to receipt of the override message, automatically wirelessly transmit default payment card data for a default payment card from the IW module to the enhanced POS computer device, causing the enhanced POS computer device to transmit the default payment card data over the payment network to process the payment transaction.

20. One or more computer-readable storage media having computer-executable instructions embodied thereon, wherein, when executed by at least one processor on an intelligent wallet (IW) computer device associated with a payment card network, the IW computer device in communication with an enhanced point-of-sale (POS) computer device configured to communicate with the IW computer device wirelessly, wherein the enhanced POS computer device is further configured to provide a merchant category code (MCC) selected from a group of merchant category codes and identifying a business category associated with the merchant, and wherein the IW computer device is a mobile computing device associated with a cardholder, the computer-executable instructions cause the processor to:

download payment card rules for each of the plurality of payment cards from a third party computing device and store the downloaded payment card rules in a memory device;
wirelessly receive event data from the enhanced POS computer device including at least a time and a location associated with a payment transaction between the cardholder and a merchant;
wirelessly receive transaction data from the enhanced POS computer device associated with the payment transaction, the transaction data including product identifier data, the first MCC, and purchase amount data;
receive the payment card rules and cardholder preferences for each of a plurality of payment cards associated with the cardholder;
retrieve a current rewards program status associated with each of the plurality of payment cards;
apply the payment card rules and the cardholder preferences to the transaction data including the MCC received from the enhanced POS device to determine a potential rewards program impact on each current rewards program status when each payment card is used to perform the payment transaction;
recommend, based on the determined potential rewards program impact associated with each payment card, a single candidate payment card from the plurality of payment cards by processing the event data and the transaction data with the payment card rules and the cardholder preferences such that the single recommended candidate payment card has the highest potential rewards program impact of the plurality of payment cards;
display the single recommended candidate payment card on the IW computer device without displaying any of the other payment cards of the plurality of payment cards, wherein the single recommended candidate payment card is displayed with a prompt allowing the cardholder to approve the use of the single recommended candidate payment card in the payment transaction;
receive a confirmation message from the cardholder in response to the single recommended candidate payment card; and
in response to receipt of the confirmation message, automatically wirelessly transmit payment card data for the single recommended candidate payment card from the IW computer device to the enhanced POS computer device, causing the enhanced POS computer device to transmit the payment card data over a payment network to process the payment transaction.

21. Computer-readable storage media in accordance with claim 20, wherein the computer-executable instructions further cause the processor to:
receive setup data including payment card data for each of the plurality of payment cards and the cardholder preferences for each of the plurality of payment cards; and
store the setup data within the memory device.

22. Computer-readable storage media in accordance with claim 20, wherein the computer-executable instructions further cause the processor to:
receive an override message from the cardholder in response to the single recommended candidate payment card; and
in response to receipt of the override message, automatically wirelessly transmit default payment card data for a default payment card from the IW computer device to the enhanced POS computer device, causing the enhanced POS computer device to transmit the default payment card data over the payment network to process the payment transaction.

23. Computer-readable storage media in accordance with claim 20, wherein the computer-executable instructions cause the processor to receive the MCC transmitted by the enhanced POS computer device after the enhanced POS computer device transmits an authorization request message over the payment network.

* * * * *